No. 860,614. PATENTED JULY 16, 1907.
G. E. WHITNEY.
MOTOR VEHICLE.
APPLICATION FILED OCT. 10, 1906.
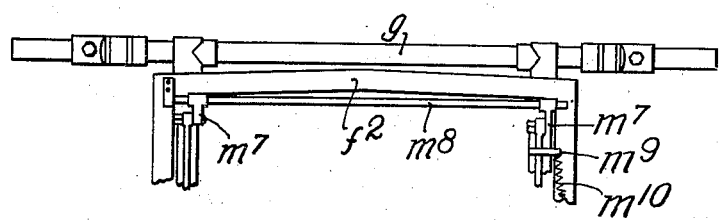
Fig. 1.
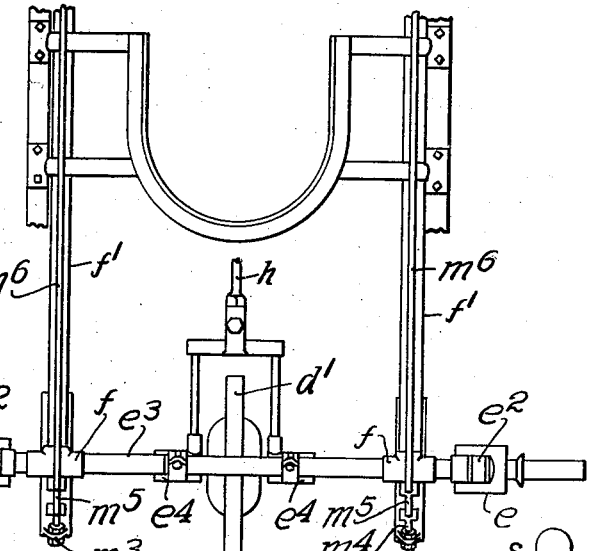
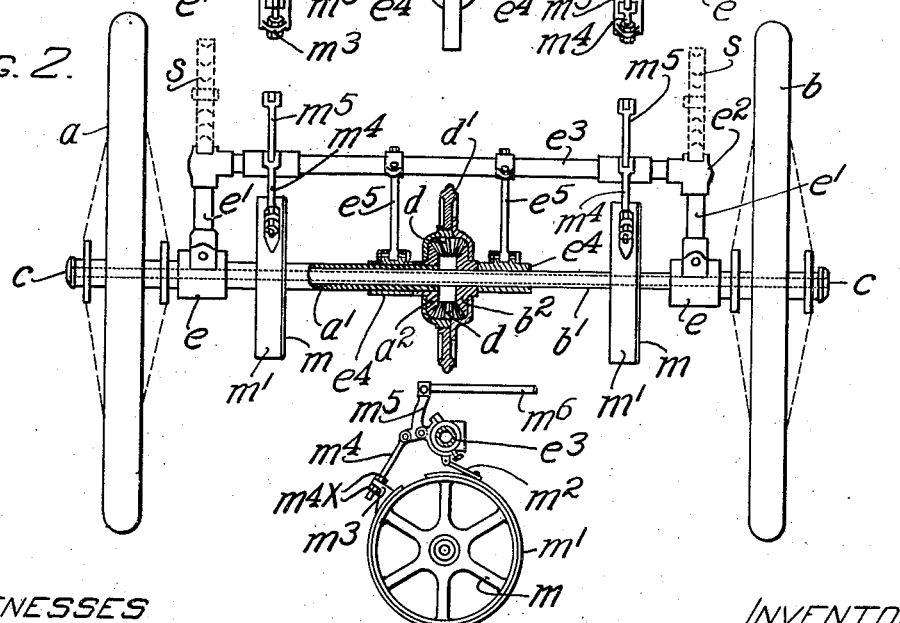
Fig. 2.
Fig. 3.
WITNESSES
A. T. Palmer
H. M. Kelso
INVENTOR
George E. Whitney
by Richard P. Elliott
Attorney

UNITED STATES PATENT OFFICE.

GEORGE E. WHITNEY, OF YONKERS, NEW YORK.

MOTOR-VEHICLE.

No. 860,614.        Specification of Letters Patent.        Patented July 16, 1907.

Continuation of application Serial No. 68,732 filed July 18, 1901. This application filed October 10, 1906. Serial No. 338,332.

*To all whom it may concern:*

Be it known that I, GEORGE E. WHITNEY, a citizen of the United States, and a resident of Yonkers, county of Westchester, and State of New York, have invented certain new and useful Improvements in Motor-Vehicles, of which the following is a specification, reference being had to the drawings accompanying the same.

My invention relates to motor vehicles.

Motor vehicles as commonly constructed have the driving axle, usually the rear axle, constructed in two parts, each of which carries a driving wheel, and these two parts are connected by what is commonly known as a compensating mechanism that permits one of the parts with its wheel to travel at a different rate of speed from the other part with its wheel when the vehicle is rounding a curve, thus enabling one of the wheels to travel the longer path of the longer radius, without slipping either wheel. In carriages constructed in this manner, it is common to apply the drive chain or driving member to the central member or spider of the compensator, which member or spider is constructed in the form of a wheel for this purpose, so that whatever be the relative speed of rotation of the two parts of the driving axle, they both receive maximum driving power from the centrally arranged driving spider or member of the compensator. The brake wheel is usually applied to one of the parts of the driving axle, or, perhaps more commonly, said brake wheel is applied directly to the driving member of the compensator.

That construction which involves the placing of the brake wheel upon one of the parts of the driving axle is open to the objection that should the compensator give out, the braking effect cannot be transmitted from the part of the axle that carries the brake wheel to the other part of the axle beyond the compensator; consequently, the braking effect is received by one of the wheels only. An objection to the practice of applying the brake to the driving member of the compensator is that should the compensator give out, as it is apt to do, the braking effect can be transmitted to neither part of the axle and neither wheel.

My invention contemplates a braking wheel or device for each part of the axle, so that the braking effect is applied to each part of the axle, whether or not the intervening compensator or other mechanism is intact or destroyed.

My invention further contemplates various improvements in the arrangement of the braking mechanism, frame, etc., all tending to the general improvement and efficiency of the vehicle.

In the drawings,—Figure 1 is a plan view partially broken away, of a motor vehicle frame, with sufficient connected parts to enable my invention to be understood; Fig. 2 is a rear elevation of the parts shown in Fig. 1, with the wheels applied; and Fig. 3, a detail, illustrating one form of brake appliance or device.

In the embodiment of my invention here selected for illustration and shown in the drawings, first referring to Fig. 2, $a$, $b$, are two driving wheels,—herein the rear wheels of the vehicle,—they being fast, respectively upon the ends of the two driving axle members, $a'$, $b'$. The axle member $a'$, is here shown as tubular in form, and receives within it the member, $b'$, so that one may turn within the other, yet each acts as a support for the other to prevent buckling of the composite axle made up of the two members, which buckling is a source of weakness in axles where the two parts merely abut one against the other without overlapping or telescoping. Preferably, the member $b'$ is also tubular, to receive the through and through bolt, $c$, that has a head or nut at the outside of each of the wheels, as indicated, to prevent separation of the parts of the axle in the event of any of the connecting mechanism being disrupted.

The parts $a'$, $b'$ of the driving axle have fast upon them, respectively, the bevel compensating and driving wheels, $a^2$, $b^2$ in mesh with the series of intervening pinions, $d$, $d$, having their bearings in the driving member, $d'$ of the compensator, said driving member being here shown as in the form of a driving or sprocket wheel. This form of compensator with the driving member in the form of a sprocket wheel is well-known at the present time, and its operation is so well understood that it need not be specifically referred to herein.

The driving axle composed of the parts $a'$, $b'$, has its bearings in suitable boxes, $e$, $e$, detachably secured to the upright members, $e'$, provided at their upper ends respectively, with the angle fittings, $e^2$, between which is arranged and to which is secured as by brazing or otherwise, the rear crown member, $e^3$, of the frame. The angle fittings, $e^2$, are also constructed to serve as seats for the springs, $s$, $s$, indicated in dotted lines, Fig. 2. Preferably, additional bearings, $e^4$, are provided for the driving axle at each side of and close to the compensator, said bearings being suspended by links, $e^5$, from the rear crown member, $e^3$, of the frame, such additional bearings serving to stiffen the rear axle and increase the smooth running of the parts thereof.

The rear crown member, $e^3$, of the frame is provided between its ends with suitable T fittings, $f$, $f$, see Fig. 1, that receive the ends of the longitudinal frame members or perch rods, $f'$, that are connected in suitable manner, as by the front end member, $f^2$, the whole going to make up a suitably constructed vehicle frame.

The front axle, g, is suitably attached to this rectangular vehicle frame, preferably by longitudinal, horizontal, pivotal connections not shown.

The usual distance member or strut, h, that connects the motor or engine with the driving axle, has its forked rear end conveniently secured to the intermediate bearings, $e^4$, at the sides of the compensator referred to.

Each of the parts, $a'$, $b'$, of the driving axle has fast upon it, as here shown, a brake wheel, m, encircled in whole or in part by a brake band, $m'$, of suitable material or construction, preferably faced with an enduring friction creating surface. This brake band, $m'$, as here constructed, has one of its ends connected by a link, $m^2$, with the T fitting, f, of the frame referred to. The opposite end of the said brake band is shown as provided with an upturned lug, $m^3$, through which is passed a link, $m^4$, threaded to receive the lock nuts, $m^{4x}$, one at each side of the said lug, $m^3$, and by which the effective length of said link may be varied at will. This link, $m^4$, is connected at its upper end to the horizontal arm of a bell crank lever, $m^5$, fulcrumed between suitably formed ears or bearings, upon the T fitting, f, referred to, the vertical arm of each bell crank lever, $m^5$, having connected to it a reach rod, $m^6$, extending towards the front end of the frame.

The reach rods that control the bell cranks of the two brake wheels and their brakes, may be suitably operated from a point convenient to the operator of the vehicle or otherwise, they being here shown as connected at their front ends, respectively, to the arms, $m^7$, fast on a cross-shaft, $m^8$, carried by the frame at its front end, one of the said arms, $m^7$, being extended to furnish a foot treadle, $m^9$, Fig. 1, with a spring, $m^{10}$, to maintain the brake mechanism normally in its inactive or released position. Obviously, any forward movement of the foot treadle, $m^9$, will cause the bell cranks, $m^5$, of the two brakes, to be tipped about their fulcra to tighten their respective brake bands about and upon the brake wheels within the same, so that a very powerful braking effect is had, particularly when the brakes are designed, as in the present instance, so that the rotation of the wheels tends the more tightly to apply the brake bands thereto. Thus, each driving wheel and each member of the driving axle has its own brake independently applied, that is, the application of one does not follow from, nor is it dependent upon the application of the other, even though both are operated by a common initial operating member. Hence, if the compensator be destroyed or broken, the operator still has complete control of his vehicle, and, by applying the brakes, may exert restraining power upon both axle members and both driving wheels. Furthermore, the brake efficiency is in no wise dependent upon or limited by the strength of the compensator that connects the two parts of the axle. Also, it will be noticed that the brakes are so located relative to the longitudinal main frame members or perches, $f'$, that the pull upon the links, $m^2$, and upon the reach rods, $m^6$, are received by said frame members or perches longitudinally or in the direction in which they are capable of receiving the greatest pressure without damage. Consequently, the operator may apply the brakes, as shown in the drawings, with the greatest force possible, without fear of buckling or weakening the frame. In fact, the rear crown member, $e^3$, sometimes called an arch member, is practically relieved of all buckling tendency upon the application of the brake, for the pressure being applied at the front ends of the longitudinal frame members, $f'$, and the resistance at the rear ends thereof, the said frame members receive practically the entire load in themselves, regardless of the shape, construction or arrangement of the rear arch or frame member.

The construction shown, while furnishing a perfectly rigid and strong rear frame construction, further leaves the two parts of the driving axle exposed, substantially for their entire lengths, which is a very desirable feature when access thereto is needed for repairs or otherwise.

My invention is not restricted to the particular embodiment thereof here shown, but may be varied within the spirit and scope of the invention.

Having described my invention, what I claim and desire to secure by Letters Patent is,—

1. A motor vehicle having a frame comprising longitudinal frame members, and a connecting rear crown member, a two-part driving axle journaled in bearings carried by said rear crown member, and a brake device on each axle part and connected with said frame, substantially in alinement with said longitudinal frame members, respectively, whereby the latter receive in the direction of their length the braking power and effect.

2. In a motor vehicle a frame comprising longitudinal members, a connecting rear crown member, a two-part driving axle journaled in bearings carried by said rear crown member, each of said parts being exposed for a part of its length between said bearings, compensating mechanism connecting the parts of said driving axle, a brake wheel applied to the exposed part of each axle, and connections between said brake wheel and said frame substantially in line with the longitudinal members of the latter.

3. In a motor vehicle a frame comprising longitudinal members, a connecting rear crown member, vertical end members supporting the latter and spring seats arranged directly over said end members with axle bearings carried by the lower ends of said vertical end members, a two-part driving axle journaled in said bearings with a connecting compensator, and a brake device arranged on each axle part under said rear crown member and in alinement with said longitudinal frame members.

4. In a motor vehicle a frame comprising longitudinal members, a connecting rear crown member supported at its ends by vertical end members having bearings for the driving axle, spring seats supported over said vertical end members, a two-part driving axle journaled in said bearings, a connecting compensator, intermediate axle bearings at each side respectively of said compensator and suspended from said rear crown member, and a separate brake device for each axle member.

5. In a motor vehicle a two-part driving axle, a frame arch or crown having bearings for said driving axle, leaving the latter exposed between said bearings, and a brake device on each exposed axle part and between the bearings of said arch.

6. In a motor vehicle an arch frame having bearings at its ends, a two-part driving axle journaled in said bearings, said axle members being exposed for a part of their lengths between said bearings, a connecting compensator for said axle parts, separate brake devices for said axle parts, intermediate bearings, one on either side of said compensator and suspended from said arch, and a distance member for the motor acting upon said intermediate bearings.

7. A motor vehicle having a frame provided with a rear transverse supporting member, longitudinal members attached thereto, a two-part driving axle carried by said frame, a band-brake for each driving part, and a brake operating lever for each brake fulcrumed at or near the point of attachment between the said transverse and longitudinal members.

8. A motor vehicle having a frame provided with a two-part driving axle, longitudinal frame members, a rear transverse supporting member forming a crown member substantially over and above the rear axle, a band brake for each driving part of the axle, and a band brake operating lever for each brake fulcrumed at or near the point of attachment between the said transverse and longitudinal members and substantially vertically over the band brake.

In testimony whereof, I have hereunto set my hand, in the presence of two subscribing witnesses, this the nineteenth day of September, 1906.

GEORGE E. WHITNEY.

Witnesses:
SIDNEY F. SMITH,
ROBERT H. KAMMLER.